Jan. 14, 1947.                    W. W. SMITH                         2,414,177
                        METHOD OF MAKING BATTERY SEPARATORS
                                Filed Jan. 30, 1942

WITNESS:

INVENTOR
William Wharton Smith
BY
Augustus B. Stoughton
ATTORNEYS.

Patented Jan. 14, 1947

2,414,177

UNITED STATES PATENT OFFICE 2,414,177

METHOD OF MAKING BATTERY SEPARATORS

William W. Smith, Philadelphia, Pa., assignor to The Electric Storage Battery Company, Philadelphia, Pa., a corporation of New Jersey Application January 30, 1942, Serial No. 428,874

3 Claims. (Cl. 18—56)

This invention relates to battery retainers or separators adapted to be used between the positive and negative plates of a battery element, and has for its object the provision of an improved separator of this type and new and improved methods for manufacturing the same at low cost.

More particularly, this invention relates to separators of the type referred to in the art as microporous separators. These separators are usually of rubber or rubber-like material and their structure is such that a large number of minute openings or pores are provided per square inch of surface in either a uniform or non-uniform pattern. One example of such a microporous material is described and claimed in United States Patent 1,745,657 issued February 4, 1930, to Herman Beckmann. Separators of this type are usually flat, and, while useful in many types of batteries, it has been found that they possess certain disadvantages when used with light-weight primary or secondary batteries of high capacity or when used with dry-charged secondary batteries. The principal disadvantages are that the flat surface inhibits the free gassing of the positive and negative plates and the free circulation and diffusion of the electrolyte. In the case of dry-charged secondary batteries, these factors increase the time between the introduction of the electrolyte and the commencement of discharge.

In order to overcome these difficulties, it has been proposed to provide ribs on the surface of the flat separator either by grinding a cured microporous rubber separator or by molding a ribbed separator directly from the uncured rubber. Both of these methods are expensive and difficult. With the grinding method, it is economically impossible to provide ribs on both sides of the separator due to inherent shortcomings of the method. Moreover, it has been found that the ribbed structure does not accommodate itself readily to spaces of slightly varying size between the positive and negative plates of the battery element due to its limited compressibility and flexibility.

Of the two methods proposed, the grinding method is most susceptible to quantity production but this grinding method possesses other inherent disadvantages. For example, it is wasteful of the microporous rubber material, for the separator must be made thicker to withstand the grinding operation and a large part of this added material is cut away; it produces a relatively non-uniform rough separator which at times is difficult to insert between the assembled plates of a battery element; and it produces dust which fills some of the pores of the separator and subsequently washes into and causes foaming and discoloration of the electrolyte.

It is a specific object of this invention to produce a new and improved microporous storage battery separator which permits free gassing of both the positive and negative plates of the battery element and increased circulation and diffusion of electrolyte and which is sufficiently compressible and flexible to accommodate itself to spaces of varying widths between the plates.

It is a further specific object of this invention to provide a relatively thin, flexible and uniformly corrugated microporous storage battery separator.

It is a still further object of this invention to provide new and improved processes for making such a corrugated microporous separator in large quantities and at low cost.

Further objects and advantages of my invention will become apparent as the following description proceeds, and the features of novelty which characterize my invention will be set forth in the claims appended to and forming a part of this specification.

In accordance with my invention, microporous material in sheets is further processed to produce a thin, corrugated separator having the same microporosity as the original sheet. In other words, by my improved process the physical characteristics of the microscopically visible pores of the basic material remain substantially unchanged although the physical shape of the material is altered. One of the essential steps of my improved process comprises filling the interstices of the microporous structure with a suitable fluid and then processing the material to produce the desired physical shape. The function of the filling fluid is to prevent collapsing of the minute pores of the material during the remainder of the process.

For a further understanding of my invention, reference should be had to the accompanying drawing in which.

Figure 1:
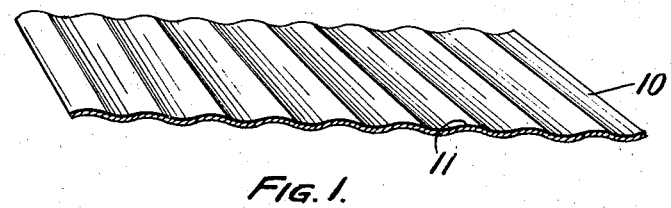
Fig. 1 is a perspective view partly in section showing the improved corrugated microporous separator produced in accordance with my invention.

Referring to the drawing, Fig. 1 shows one form of the improved separator of my invention. This separator comprises a thin sheet 10 of rubber or rubber-like material which is pervaded with microscopically visible pores. Integrally formed in the sheet 10 are uniform undulations or corrugations 11 extending preferably parallel to one side of the sheet. As illustrated, the sheet is relatively thin, having a thickness of the order .006–.025 inch, and its surfaces, though undulating in character, are smooth and unbroken. The undulations or corrugations in the sheet are permanent and will not flatten so long as the ambient temperature is maintained below 180° F. These corrugations, coupled with the thinness of the material, impart considerable flexibility to the separator, which flexibilty is useful both in the assembly of the battery and in operation of the plates of a battery and in operation of the battery.

Although the sheet 10 is corrugated, its porosity is unaffected. In other words, the physical characteristics of the microscopic pores in the bent or curved portions of the sheet are substantially the same as those in the remainder of the sheet. This important feature of my improved separator is accomplished by my improved method of making the article to be described in connection with Fig. 2 in which I have illustrated representative apparatus for practicing my improved method in a continuous process.

Figure 2:
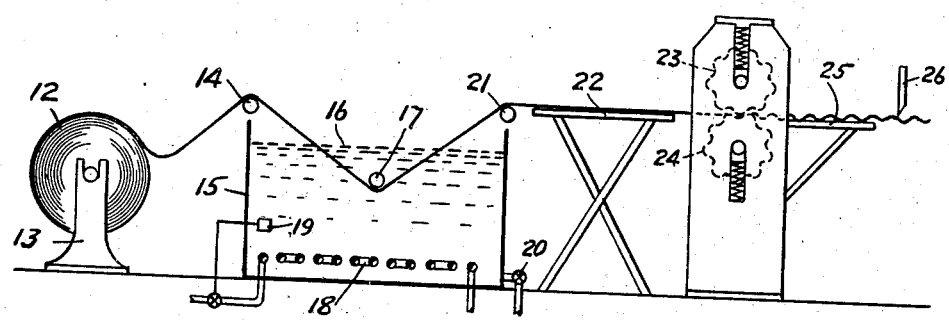
Fig. 2 is a diagrammatic representation of one form of apparatus suitable for practicing my invention.

Referring to Fig. 2, the microporous rubber or rubber-like material to be processed is fed from a roll of the material 12 which is supported on a pedestal 13. The unprocessed stock 12 is preferably the type of material produced by the process described and claimed in Patent 1,745,657 to Beckmann, and comprises a sheet of vulcanized material pervaded with uniformly distributed microscopically visible pores. The principal ingredient from which this material is produced is latex or other rubber solution. It will, of course, be understood that my invention is not limited to this particular material.

The material 12 is fed from the roll over a suitable roller 14 and into an immersion tank 15 which is filled with a liquid such as water to the level indicated in dotted line 16. In order to insure that the sheet in passing through the tank will be completely immersed in the liquid in the tank, a roller 17 is povided in the tank under which the sheet of material is passed. The liquid in the tank 15 is heated by suitable means to a temperature of not less than approximately 180° F., and not more than approximately 212° F. In the particular apparatus illustrated, the liquid is heated by a steam heating element 18 but it is obvious that other types of heating means could be employed for this purpose.

In order to maintain the temperature of the liquid in the tank at the desired value, a suitable thermostatically operated device 19 is provided for controlling the supply of heating medium to the heating element 18. Furthermore, in order to maintain the level of the liquid in the tank 15, there is provided suitable manually or automatically operated liquid supply means 20.

By immersion in the tank 15, the pores of the sheet of vulcanized microporous material 12 are filled with liquid and at the same time the temperature of the material is raised to about 180° F. Since the material is thermoplastic, it is changed from a hard, relatively brittle product to a soft, relatively ductile and permanently deformable material.

The heated and filled sheet of material is next fed from the tank 15 over the roller 21, onto the support 22 which is heated by suitable means (not shown) to maintain the temperature of the heated and filled sheet of material. From the support the material is fed between a pair of rollers 23 and 24 which are controlled as to temperature and which are driven by suitable means not shown.

As shown in Fig. 2, the surfaces of the rolls 23 and 24 are so formed as to produce the desired type of corrugations in the material being processed. Any suitable form of corrugation may be used. For example, the corrugations may have a sinusoidal wave form or they may have a substantially saw toothed wave form. The corrugations on the rolls 23 and 24 extend parallel to the axis of the rolls and, by having the axis of the roll extend substantially perpendicular to the path that the material follows in traversing through the rolls, it is possible to keep the width of the material uniform, for any puckering which takes place will extend back along the length of the material.

As shown in Fig. 2, both of the rolls are spring biased against the material so as to automatically compensate for small variations in thickness of the material. It will be understood, of course, that the corrugations on the upper and lower roll are in mating relationship.

In passing through the rolls, the heated and filled material will be formed and at the same time cooled sufficiently to cause partial setting of the material in its corrugated shape. After leaving the forming rolls, the material is slightly damp, and it is desirable to further dry it either by a natural draft air-drying operation on the table 25 or by an air blast from suitable means (not shown). After drying, the material is fed to a cut-off tool 26 where it is cut to sizes suitable for storing and for use in storage batteries.

From the foregoing, it will be observed that there is provided in accordance with this aspect of my invention a relatively simple, continuous process for producing a permanently corrugated, flexible microporous separator. It has been found that filling the pores of the vulcanized microporous material with a liquid effectively prevents collapsing of the pores during the forming operation and after corrugating or forming, the physical characteristics of the pores, i. e., size, shape, etc., at the bends in the sheet have been found to be substantially the same as the pores in the remainder of the sheet. Thus the porosity of the corrugated sheet is the same as that of a flat sheet. The application of heat at the time the pores or filled or subsequently thereto puts the vulcanized microporous material in such physical condition that it can be readily deformed by passing through the type of forming machine described. The additional heat applied to the rolls produces local heating during the forming operation to compensate for any cooling of the material in passing from the immersion tank to the forming rolls. Since the corrugations are formed in the material at temperatures higher than those encountered during normal battery operation, they are permanent and the separator does not tend to straighten out in use.

Figure 3:
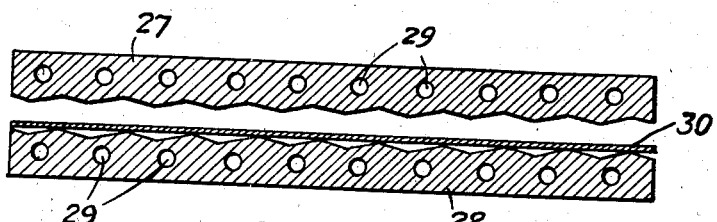
Fig. 3 is a sectional view of apparatus for producing a corrugated microporous separator by a discontinuous process in accordance with my invention.
Figure 4:
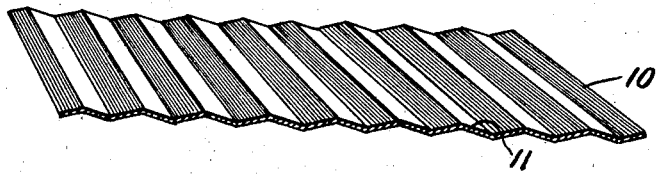
Fig. 4 is a view similar to Fig. 1 of the separator produced by the apparatus shown in Fig. 3.

In Fig. 3 I have shown a modified device which may be used in forming the corrugated microporous separator. This device comprises a pair of corrugated plates 27 and 28, which are heated by suitable means 29. It will be understood that, before the material 30 to be formed is fed to these plates, it will have been filled with a liquid and heated to the temperature previously set forth. Thereafter, by the application of additional heat and pressure, it will be formed between the corrugated surfaces of the platens. The plates are then permitted to cool to set the separator in its corrugated shape before relieving the pressure. Thereafter, the finished product is removed. It is, of course, obvious that, in using such a forming device, the production of the corrugated separator will be discontinuous. Fig. 4 shows the corrugated separator produced by the particular platen illustrated but it will be understood that platens of other shapes may be employed.

Modifications of my invention, in addition to those already suggested, will become apparent to those skilled in the art. It will be understood, therefore, that I contemplate, by the appended claims, to cover all such modifications as fall within the true spirit and scope of my invention.

I claim:

1. The method of forming corrugated microporous storage battery separators which comprises filling the pores of a sheet of vulcanized microporous rubber with water, raising the temperature of the filled sheet to not less than approximately 180° F., or more than approximately 212° F., pressing the wet and heated sheet between corrugated forms to corrugate substantially its entire surface, and thereafter cooling and drying said sheet.

2. The method of corrugating vulcanized microporous rubber storage battery separators and retaining their porosity which comprises immersing the vulcanized microporous rubber sheet in water heated to a temperature within the range of approximately 180° F. to 212° F. to fill the pores of said sheet, deforming the wet and heated material between corrugated forms, and setting the sheet in its deformed shape by cooling and drying the same.

3. The method of corrugating vulcanized microporous rubber storage battery separators and retaining their porosity which comprises immersing the vulcanized microporous rubber sheet in water to fill the pores of said sheet, heating the filled sheet to not less than approximately 180° F., or more than 212° F., passing said filled and heated sheet between corrugated forms, deforming said sheet by the application of pressure to said corrugated forms, partially setting said sheet by cooling the same while the pressure is still applied, and completely setting said sheet by further cooling and drying after the pressure has been relieved.

WILLIAM W. SMITH.